W. E. Leighton,
Belt Shifter.
No. 101,745. Patented Apr. 12, 1870.

Witnesses

Inventor
W. E. Leighton
per Attorneys

United States Patent Office.

WILLIAM E. LEIGHTON, OF PEMBROKE, MAINE.

Letters Patent No. 101,745, dated April 12, 1870.

IMPROVEMENT IN BELT-SHIFTERS.

The Schedule referred to in these Letters Patent and making part of the same.

*To all whom it may concern:*

Be it known that I, WILLIAM E. LEIGHTON, of Pembroke, in the county of Washington and State of Maine, have invented a new and improved Belt-Shifter; and I do hereby declare that the following is a full, clear, and exact description thereof, which will enable others skilled in the art to make and use the same, reference being had to the accompanying drawings forming part of this specification.

This invention relates to improvements in belt-shifting apparatus; and

It consists in the application to the belt of a pair of clamping-pulleys or rollers capable of clamping the belt between them, and of being turned obliquely to the line perpendicular to that of the belt either way, whereby the belt will be caused to move laterally either to the right or left, as the said clamping-pulleys are turned.

Figure 1:
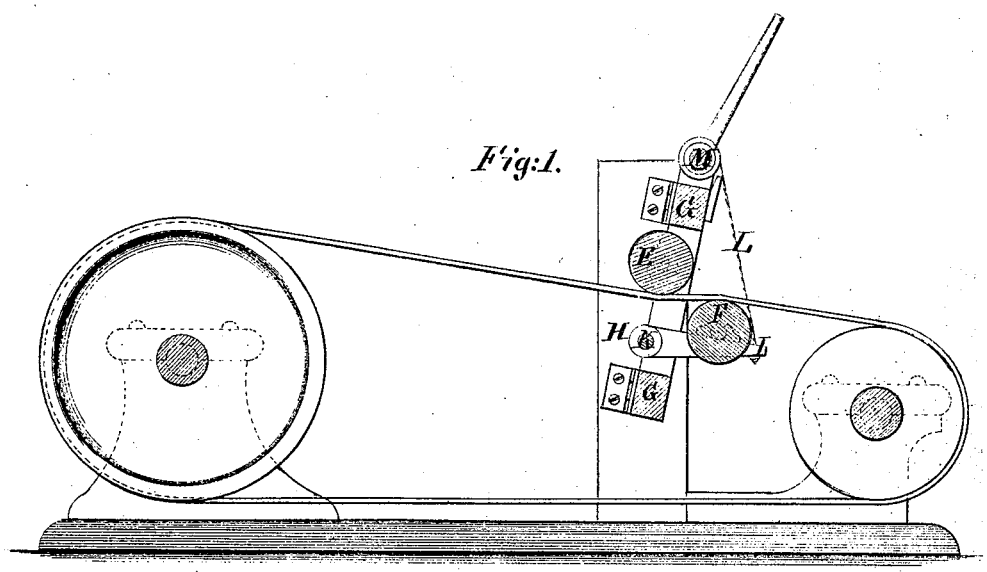
Figure 2:
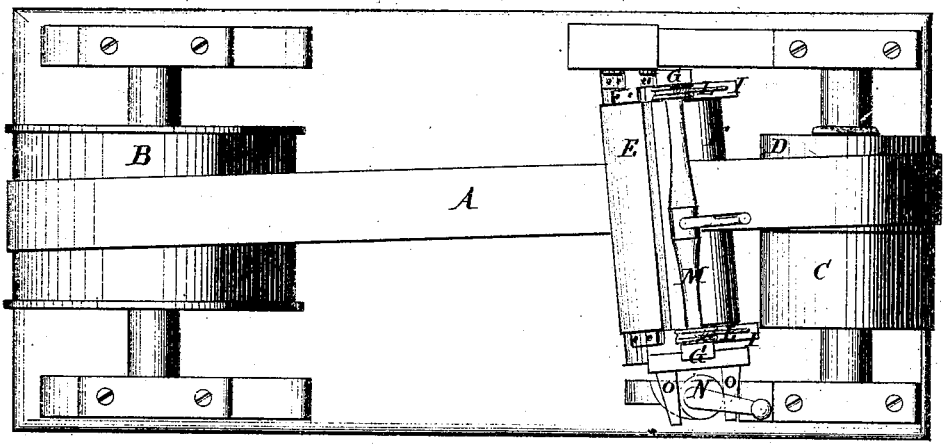

Figure 1 is a longitudinal sectional elevation of my improved apparatus applied to a belt; and Figure 2 is a plan view of the same.

Similar letters of reference indicate corresponding parts.

A is the belt.

B, the driving-pulley; and

C D, the fast and loose pulleys on the counter-shaft.

E F are the clamping-pulleys placed between the driver and the others, in a frame, G, hinged to a vertical support, H, made to swing so that the pulleys may be adjusted across the belt obliquely on either side of the line perpendicular to the belt, the latter being between them.

The pulley E is in fixed bearings, and the other is supported in arms I, pivoted to the frame at K, and capable of swinging up and down to permit the clamping of the belt between them, so that it may be controlled in respect of its direction by them, which is done by the tendency of the belt to run, after passing between the clamping-pulleys, in lines perpendicular thereto.

For raising the lower pulley up against the belt the arms I are connected by cords L to a roller, M, at the top of the frame, which may be turned by any suitable means for winding up the cords and for changing the clamping-pulleys from one oblique position to another. I have represented in this instance an eccentric-wheel, N, journaled to the frame between two projections, O, on the frame G, which, being turned by a hand-crank or other suitable means, will move the free end of the said frame G back and forth, as required.

Any other suitable arrangement of means for working the lower roller and the frame may be used; for instance, cords and weights working over rollers may be attached to the arms I, or to a lever or pulley on the winding-shaft M. They may also be used to work the frame G by attachment to the projections O.

I have arranged the clamping-pulleys one in advance of the other, for the purpose of avoiding the jar which would be caused by the joints of the belt in passing between the pulleys if placed one under the other, but except for this reason they may be so placed if preferred.

Having thus described my invention,

I claim as new and desire to secure by Letters Patent—

A belt-shifting apparatus, consisting of a pair of pulleys arranged to clamp the belt between them, and to be shifted for working obliquely on the belt either side of the perpendicular line thereof, substantially as specified.

WILLIAM E. LEIGHTON.

Witnesses:
E. E. WILDER,
B. O. WILDER.